April 6, 1926.

G. F. CONNELLY

PNEUMATIC TIRE MOLD

Filed Jan. 20, 1925

INVENTOR
GEORGE F. CONNELLY
BY
ATTORNEY

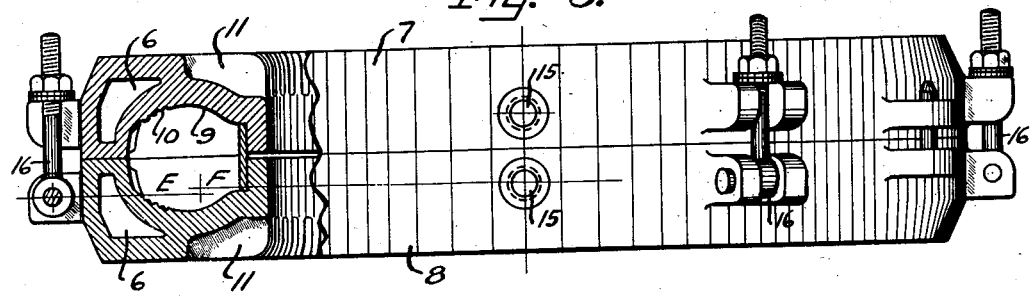
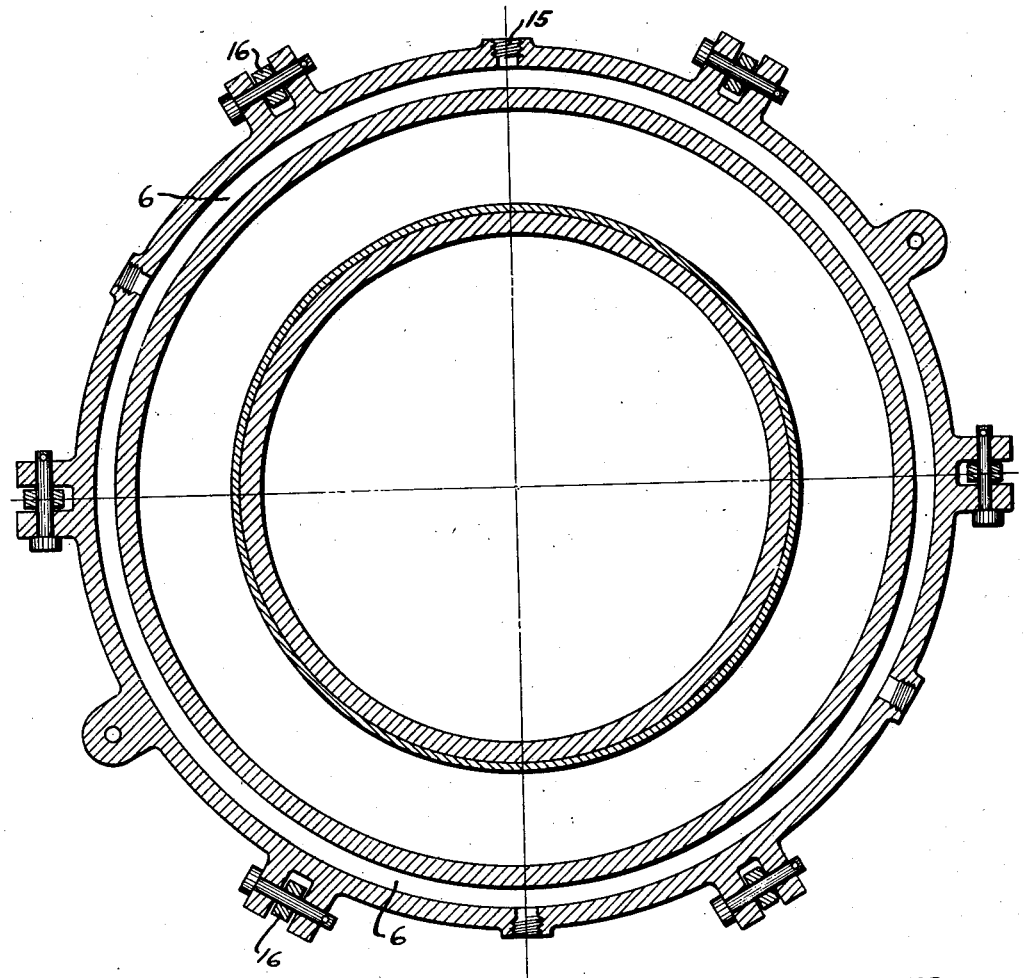

Patented Apr. 6, 1926.

1,579,518

UNITED STATES PATENT OFFICE.

GEORGE F. CONNELLY, OF SAN FRANCISCO, CALIFORNIA.

PNEUMATIC-TIRE MOLD.

Application filed January 20, 1925. Serial No. 3,600.

*To all whom it may concern:*

Be it known that I, GEORGE F. CONNELLY, a citizen of the United States, and resident of the city and county of San Francisco, State of California, have invented a certain new and useful Improvement in Pneumatic-Tire Molds, of which the following is a specification.

This invention relates to that class of apparatus known as rebuilding or retreading tire molds used for vulcanizing a new outer surface to the carcass of old and worn tires.

The invention more especially relates to that class of apparatus known as full circle rebuilding tire molds, usually consisting of two circular halves with an inner half circumferential cavity in each, which when placed together form a complete cavity that molds the outer surface of the tire. The cavity often contains direct embossing or embossed matrices which molds various designs on the outer surface of the tires.

In the usual type of full circle rebuilding molds, around the above described cavity a steam or heating jacket is formed individually in each half, from a point near the center of what is commonly called the tread of the tire, down the side wall of the tire to or past the bead. The result of using molds with said type of jacket has caused tires to fail at or near the beads due to overcuring by the application of too much heat near the beads.

It is one of the objects of the present invention to improve the construction of full circle rebuilding tire molds whereby the hereinbefore mentioned trouble with rebuilt automobile tires will be practically eliminated.

In other words it is an object of the invention to provide means of applying direct heat to the tread end of the mold only and to radiate said heat past the beads and thereby eliminate overcuring the rubber vulcanized on the tire at or near the beads.

It is a further object of the invention to improve full circle rebuilding tire molds so as to make them simple in operation, inexpensive in construction and superior in producing high grade rebuilt tires.

The invention possesses other objects and features of advantage some of which, with the foregoing, will be made manifest in the following description of the preferred form of the invention which is illustrated in the drawing accompanying and forming part of the specification.

It is to be understood that it is not intended to limit the invention to the embodiment shown by said drawings and descriptions, as variations may be adopted within the scope of the invention as set forth in the claims.

In the drawing,—

Figure 3 is a side elevation and part section showing the method of holding the halves together against internal pressure during vulcanization.

Figure 4 is a sectional view on lines E—F of Figure 3 showing one of the circular heating cavities used to concentrate the heat on the tread portion of the tire during vulcanization.

Figure 1:
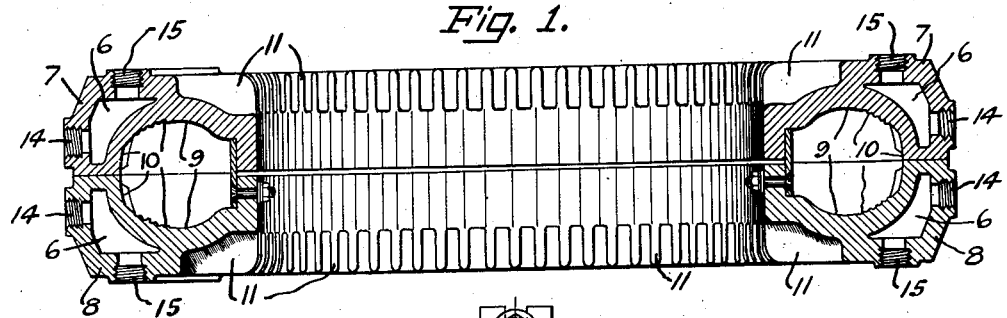
Figure 1 is a central horizontal sectional view of one type of mold involving the invention.

As hereinbefore stated, one of the principal improvements of the invention is to eliminate failure trouble in rebuilt tires caused by overcuring near the bead. This is accomplished by providing an improved steam or heating cavity 6 that concentrates the heat near the tread portion 10 in the different halves 7 and 8 as shown in the sectional view Figure 1. The cavity 6 stops at the point of junction of the tread 10 and side wall 9, thus eliminating any heating cavity nearer the bead than the point of junction of the tread 10 and the side wall 9, concentrating the direct heat to the tread portion of the tire only and thereby overcoming tire failure at the bead caused by direct heat against the side wall and bead portion of the tire during vulcanization.

Figure 2:
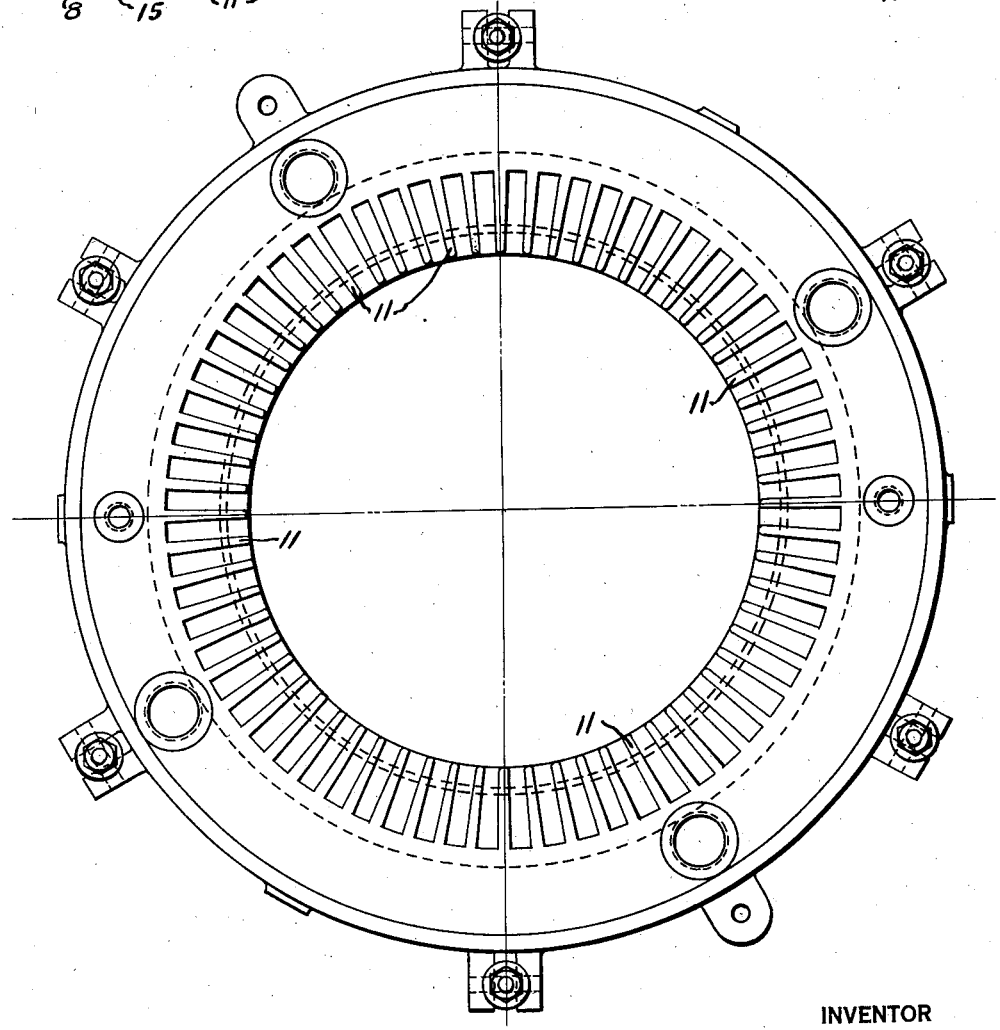
Figure 2 is a bottom plan showing the radiating vanes which draw off the heat.

The invention not only eliminates the excessive heat against the side wall and bead portions of the tire by stopping the heating cavity as hereinbefore mentioned, but it further provides for radiating the heat past said surfaces of the tire by introducing a series of improved radiating vanes 11 located as shown in Figures 1, 2 and 3, over the side wall and bead, thereby continually drawing off heat and regulating same against the side wall and bead portions to the temperature required.

Provision is made for the circulating of heat in the heating cavities 6 through the various inlets and outlets 14 and 15 respectively, it also being provided for holding the circular halves 7 and 8 together by the different bolting down lugs 16 as shown in Figures 3 and 4.

Having thus illustrated and described a certain form of construction and arrangement of parts pertaining to the invention, it is to be understood that the improvements may be embodied on any type of tire mold, which obviously may be built up in any suitable manner, the present illustration not being utilized as indicating the only form of construction into which the device may be made and it is desired to include in this application for Letters Patent all that comes within the range of the invention as set forth in the claims hereinafter mentioned.

What is claimed:

1. A tire mold comprising two circular halves with an inner half circumferential cavity in each, which when placed together forms a complete cavity that molds the outer surface of the tire and having in combination means for limiting the direct heat applied for vulcanizing, to the tread portion of the tire and means for radiating said heat past the side wall and bead of the tire for the purpose hereinbefore set forth.

2. A tire mold having in combination a heating cavity at the tread portion of the mold and a series of radiating vanes on the side wall and bead portion of the mold to eliminate overcuring the bead and side wall of the tire during vulcanization.

3. A full circle tire mold provided with means to radiate the heat over the side wall and bead portion of the mold to eliminate overcuring the side wall and bead of the tire during vulcanization.

In testimony whereof, I have hereunto set my hand.

GEORGE F. CONNELLY.